United States Patent
Seok et al.

(10) Patent No.: US 8,634,327 B2
(45) Date of Patent: Jan. 21, 2014

(54) METHOD FOR SWITCHING CHANNEL IN MESH NETWORK

(75) Inventors: Yong Ho Seok, Anyang-si (KR); Alexander A. Safonov, Anyang-si (KR)

(73) Assignee: LG Electronics Inc., Seoul (KR)

( * ) Notice: Subject to any disclaimer, the term of this patent is extended or adjusted under 35 U.S.C. 154(b) by 796 days.

(21) Appl. No.: 12/812,418

(22) PCT Filed: Jan. 9, 2009

(86) PCT No.: PCT/KR2009/000143
§ 371 (c)(1),
(2), (4) Date: Jul. 19, 2010

(87) PCT Pub. No.: WO2009/088262
PCT Pub. Date: Jul. 16, 2009

(65) Prior Publication Data
US 2010/0278166 A1    Nov. 4, 2010

(30) Foreign Application Priority Data

Jan. 11, 2008 (KR) .................... 10-2008-0003628

(51) Int. Cl.
*H04L 12/28* (2006.01)
*H04W 4/00* (2009.01)

(52) U.S. Cl.
USPC .......................................... 370/254; 370/338

(58) Field of Classification Search
None
See application file for complete search history.

(56) References Cited

U.S. PATENT DOCUMENTS

2006/0242457 A1* 10/2006 Roy et al. ........................ 714/12
2008/0226071 A1* 9/2008 Braskich et al. .............. 380/258

FOREIGN PATENT DOCUMENTS

KR    10-2006-0117195 A    11/2006
WO    WO 2006/099023 A2    9/2006

OTHER PUBLICATIONS 802.11 Working Group of the IEEE 802 Committee, "Draft Amendment to Standard for Information Technology—Telecommunications and information exchange between systems", Amendment <number>: ESS Mesh Networking, IEEE P802.11s™/D1.01, Mar. 2007, XP-008096820, pp. 1-226.
IEEE 802 Committee, IEEE Computer Society, "IEEE P802.11y™/D7.0 Draft Standard for Information Technology—Telecommunications and information exchange between systems—Local metropolitan area networks", Amendment 3:3650-3700 MHz Operation in USA, Dec. 2007, XP-002664906, pp. 1-57.
Seok et al., "Normative Text for Mesh Regulatory Class Switch", IEEE P802.11 Wireless LANs, IEEE Standards Association, Jan. 13, 2008, XP-002664816, pp. 1-5.
Shrestha et al., "Enhanced Topolgoy Formation Protocol for IEEE 802.11 WLAN based Mesh Networks", Jan. 1, 2007, pp. 1-5.
Wang et al., "IEEE 802.11s wireless mesh networks: Framework and challenges", Ad Hoc Networks, vol. 6, No. 6, (2008), pp. 970-984.

* cited by examiner

*Primary Examiner* — Kevin C Harper
(74) *Attorney, Agent, or Firm* — Birch, Stewart, Kolasch & Birch, LLP

(57) ABSTRACT

A method of performing a channel switch in a mesh network by a first Mesh Point (MP) includes configuring a peer link between the first MP and a second MP, and transmitting a mesh channel switch announcement frame from the first MP to the second MP. The mesh channel switch announcement frame includes a new regulatory class field and a new channel number field. The new regulatory class field indicates the number of a new regulatory class after the channel switch and the new channel number field indicates the number of a new channel to which the first MP is moving.

8 Claims, 8 Drawing Sheets

FIG. 5

| Order | Information | Notes |
|---|---|---|
| 1 | Category | |
| 2 | Action Value | |
| 3 | Capability | |
| 4 | Supported rates | |
| 5 | Extended Supported Rates | The Extended Supported Rates element is present whenever there are more than eight supported rates, and it is optional otherwise. |
| 6 | Power Capability | The Power Capability element shall be present if dot11SpectrumManagementRequired is true. |
| 7 | Supported Channels | The Supported Channels element shall be present if dot11SpectrumManagementRequired is true |
| 8 | RSN | The RSN information element is only present within Peer Link Open frames generated by MPs that have dot11RSNAEnabled set to TRUE. |
| 9 | QoS Capability | The QoS Capability element is present when dot11QoS-OptionImplemented is true. |
| 10 | Mesh ID | The Mesh ID information element is present when dot11MeshEnabled is true. |
| 11 | Mesh Configuration | The Mesh Configuration information element is present when dot11MeshEnabled is true. |
| 12 | Peer Link Management | The Peer Link Management information element is present only when dot11MeshEnabled is true. The subtype of the Peer Link Management Element is set to 0. |

FIG. 6

| 13 | MSCIE | The MSCIE element is present when dot11MeshEnabled is true. |
|---|---|---|
| 14 | MSAIE | The MSAIE element is present when dot11MeshEnabled is true. |
| 15 | MIC | This field is present when dot11MeshEnabled is true and the abbreviated handshake is enabled |
| 16 | Supported Regulatory Classes | The Supported Regulatory Classes information element is present if dot11ExtendedChannelSwitchEnabled is true. |
| Last | Vendor | Specific One or more vendor-specific information elements may appear in this frame. This information element follows all other information elements. |

| Category (210) | Action Value (220) | Mesh Channel Switch Announcement element (230) |

METHOD FOR SWITCHING CHANNEL IN MESH NETWORK

TECHNICAL FIELD

The present invention relates to a mesh network, and more particularly, to a procedure of switching a regulatory class and channel of a mesh point (MP) in a mesh network.

BACKGROUND ART

With the advancement of information communication technologies, various wireless communication technologies have recently been developed. Among the wireless communication technologies, a wireless local area network (WLAN) is a technology whereby high-speed Internet access is possible in a wireless fashion in homes or businesses or in a region providing a specific service by using a portable terminal such as a personal digital assistant (PDA), a laptop computer, a portable multimedia player (PMP), etc.

It is assumed that WLAN communication conforming to the institute of electrical and electronics engineers (IEEE) 802.11 standard is achieved in a region called a basic service set (BSS). A BSS region may differ according to a propagation characteristic of a wireless medium, and thus has an ambiguous boundary. The BSS can be classified into two structures, i.e., an independent BSS (IBBS) and an infra-structured BSS. The former is to constitute a self-contained network and denotes a BSS in which an access to a distribution system (DS) is not allowed. The latter includes one or more access points (APs), DSs, etc., and generally denotes a BSS in which the APs are used in all communication processes including communication between stations (STAs).

As a special type of network, a mesh network is defined in the WLAN. The mesh network may be defined as a network which supports direct communication between a plurality of wireless devices having a relay function without via an AP. Functionally, a DS of the AP can be replaced with a multi-hop path between the plurality of wireless devices. According to the mesh network, any one of the wireless devices can establish a peer-to-peer wireless link (i.e., a peer link or a mesh link) with another neighboring wireless device. Since the peer link can operate as a multi-hop path, there is an advantage in that a wireless connection can be more flexibly established.

FIG. 1 shows an exemplary structure of a mesh network. The mesh network has a unique mesh identifier. The mesh identifier is a shortened term used to identify a group of mesh points (MPs) constituting the mesh network. There is no restriction on how to assign the mesh identifier.

Referring to FIG. 1, the mesh network includes one or a plurality of STAs 131, 132, 133, and 134 and one or more wireless devices, i.e., MPs 111, 121, 122, and 123. Among these MPs, the MPs indicated by the reference numerals 121 and 122 are connected to the STAs 131, 132, 133, and 134. Thus, each of the MPs 121 and 122 acts as an MAP defined as a MP which also functions as an AP. In addition, the MP indicated by the reference numeral 121 is an MP connected to an external network in a wired or wireless fashion, which is called a mesh portal.

Each of the STAs 131 to 134 is a non-AP station and is an arbitrary functional medium including a medium access control (MAC) and physical layer interface for a wireless medium, conforming to the IEEE 802.11 standard. In addition to the terminology of a wireless station, the STA may also be referred to as a wireless transmit/receive unit (WTRU), a user equipment (UE), a mobile station (MS), and a mobile subscriber unit, etc.

Each of the MPs 111, 121, 122, and 123 is a constitutional element of a wireless mesh network and is one of IEEE 802.11-based functional entities including the MAC and physical layer interface conforming to the IEEE 802.11 standard. Each of the MPs 111, 121, 122, and 123 is a wireless device supporting a mesh service. The mesh service includes various services for enabling direct communication between the MPs constituting the mesh network. Communication between two MPs (e.g., the MPs indicated by reference numbers 121 and 123) for providing the mesh service is achieved through a peer link or a mesh link which is a direct link established between the two MPs.

In addition to the aforementioned functions of the MPs, each of the MAPs 121 and 122 also functions as an AP for an associated STA having a connection established to the MAPs 121 and 122. In the infra-structured BBS, the AP relays a frame for the STA and performs various functions for BSS management. In addition to the terminology of an access point, the AP may also be referred to as a centralized controller, a base station (BS), a node-B, a site controller, etc.

Meanwhile, in the WLAN, a regulatory class is defined in association with a frequency bandwidth or the like. The regulatory class is an index into a set of values for radio equipment sets of rules. One regulatory class includes various regulatory requirements on communication in a specific frequency bandwidth. For example, the regulatory class may differ according to combinations of a channel starting frequency, a channel spacing, a channel set, a transmit power limit, an emission limits set, a behavior limits set, etc. Accordingly, the same regulatory class is required when an MP establishes a peer link with another MP for communication. In addition, the same channel has to be used in communication between a plurality of channel sets defined in the same regulatory class.

DISCLOSURE

Technical Problem

The present invention provides a procedure capable of supporting switching of a regulatory class and channel by a mesh point (MP) in a mesh network.

Technical Solution

In an aspect, a method of performing a channel switch in a mesh network, carried in a first Mesh Point (MP), includes configuring a peer link between the first MP and a second MP, and transmitting a mesh channel switch announcement frame from the first MP to the second MP, wherein the mesh channel switch announcement frame comprises a new regulatory class field and a new channel number field, the new regulatory class field indicating the number of a new regulatory class after the channel switch, the new channel number field indicating the number of a new channel to which the first MP is moving.

In some embodiments, The peer link may be configured by exchanging a peer link open frame and a peer link response frame between the first MP and the second MP. The peer link open frame may include supported regulatory classes in which a MP transmitting the peer link open frame is capable of operating.

The method may further include setting a channel switch count field included in the mesh channel switch announcement frame to a value when the first MP initiates the channel switch, and initializing a Mesh Channel Switch (MCS) timer to the value which is contained in the channel switch count field. The first MP may switch to the new channel when the MCS timer reaches zero.

The method may further include setting a channel switch mode field included in the mesh channel switch announcement frame to one (1) when the first MP requests neighboring MPs not to transmit data frames on the current channel until the scheduled channel switch.

In another aspect, a method of performing a channel switch in a mesh network includes generating a mesh channel switch announcement frame to initiate the channel switch, wherein the switch announcement frame comprises a new regulatory class field and a new channel number field, the new regulatory class field is the number of a new regulatory class after the channel switch, and the new channel number field is the number of a new channel to which a MP is moving, and transmitting the mesh channel switch announcement frame.

Advantageous Effects

According to embodiments of the present invention, a mesh point to be switched to a regulatory class different from a regulatory class currently being set can be switched to a new regulatory class or channel. In particular, the mesh point announces the switching of the regulatory class to peer mesh points, so that the peer mesh points can also have a chance to change the regulatory class.

DESCRIPTION OF DRAWINGS

FIGS. 5 and 6 are tables showing information elements included in a body part of a peer link open frame and particular notes for each information element according to an embodiment of the present invention.

MODE FOR INVENTION

In a wireless mesh network, a mesh discovery process is performed so that a new mesh point (MP) participates in a configured mesh network or one MP establishes a peer link with another MP. The mesh discovery process can be defined as a process in which an MP which intends to establish a peer link with another MP discovers a neighboring MP or a candidate MP which can be a peer MP.

An MP configuring a mesh network has a specific mesh profile. The mesh discovery process is a process of discovering an MP which has a matched mesh profile or which can match the mesh profile. The mesh profile consists of a mesh identifier, a path selection protocol identifier, a path selection metric identifier, a congestion control mode identifier, etc.

Two schemes are used in the mesh discovery process. A first scheme uses a mesh beacon frame transmitted from another MP and is referred to as passive scanning. That is, an MP which intends to participate in the mesh network receives the mesh beacon frame periodically transmitted from another MP, and thus discovers a candidate MP to be subjected to peering. A second scheme is active scanning by which the MP which intends to participate in the mesh network first transmits a mesh probe request frame. When an MP receiving the mesh probe request frame intends to establish a peer link with a transmitting MP, the MP transmits a mesh probe response frame to the transmitting MP.

The mesh beacon frame or the mesh probe request/response frame includes mesh identifier (ID) information. In addition, the mesh beacon frame or the mesh probe response frame includes mesh configuration information. The MP which intends to establish the peer link can know mesh profile information of another MP (i.e., an MP transmitting the mesh beacon frame or an MP transmitting the mesh response frame) by using the mesh ID information and the mesh configuration information. In particular, the mesh configuration information is used to recognize other information except for a mesh ID among information elements constituting the mesh profile.

Figure 1:
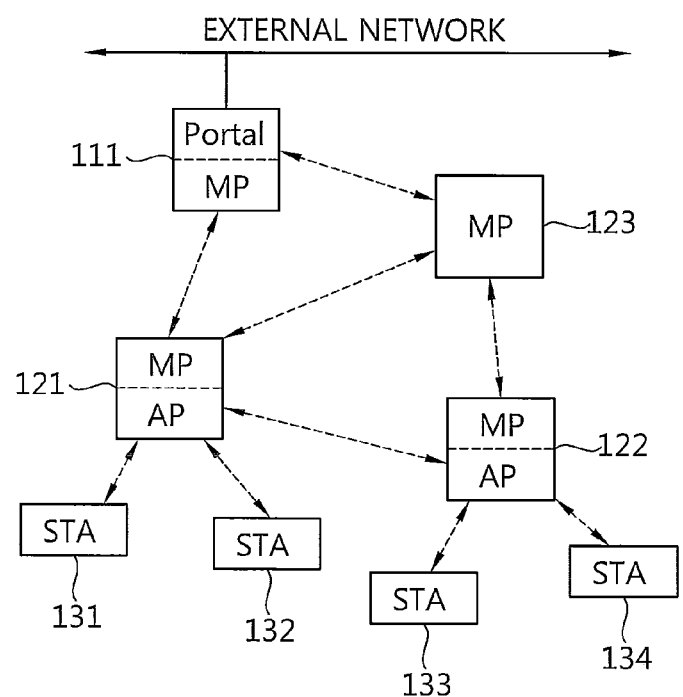
FIG. 1 shows an exemplary structure of a mesh network.
Figure 2:
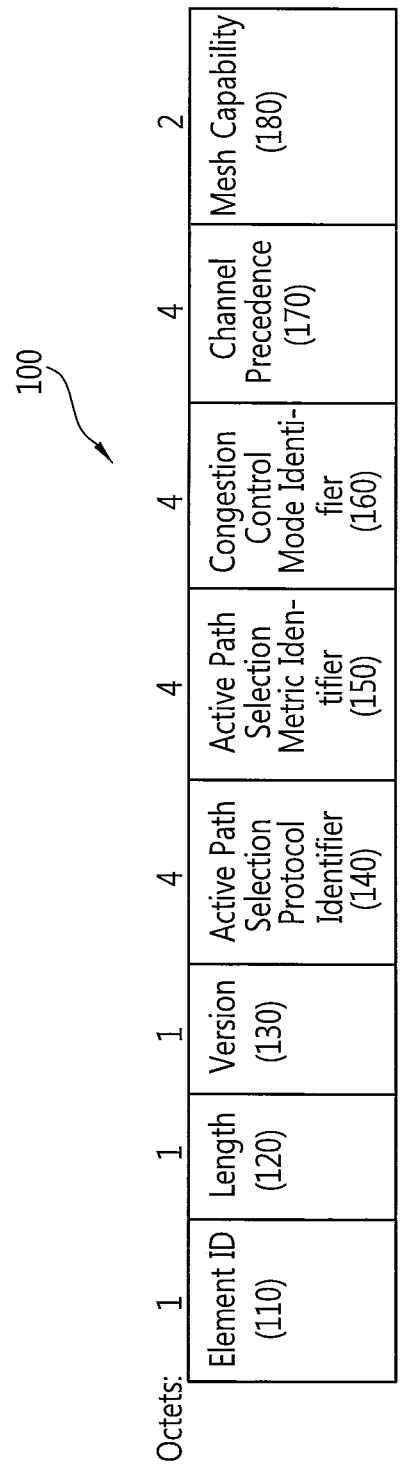
FIG. 2 shows a format of a mesh configuration information element according to an embodiment of the present invention.

FIG. 2 shows a format of a mesh configuration information element according to an embodiment of the present invention. Referring to FIG. 2, a mesh configuration information element 100 includes an element ID field 110, a length field 120, a version field 130, an active path selection protocol identifier field 140, an active path selection metric identifier field 150, a congestion control mode identifier field 160, a channel precedence field 170, and a mesh capability field 180.

Figure 3:
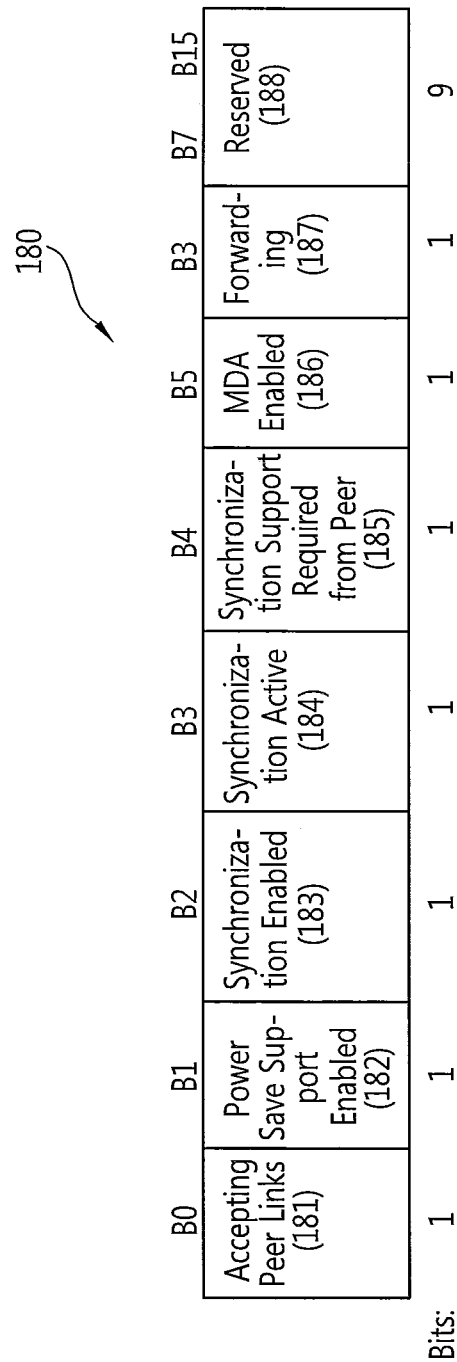
FIG. 3 shows an exemplary format of a mesh capability field included in a mesh configuration information element of FIG. 2.

FIG. 3 shows an exemplary format of the mesh capability field 180 according to an embodiment of the present invention. Referring to FIG. 3, the mesh capability field 180 includes an accepting peer links subfield 181, a power save support enabled subfield 182, a synchronization enabled subfield 183, a synchronization active subfield 184, a synchronization support required from peer subfield 185, a mesh deterministic access (MDA) enabled subfield 186, and a forwarding subfield 187.

When neighboring MPs are discovered by using one of the aforementioned schemes used in the mesh discovery procedure, an MP attempts a mesh link establishment procedure with the discovered neighboring MPs. The mesh link establishment procedure implies establishment of a logical link between MPs, and is also referred to as peering. In the mesh network, a mesh data frame can be transmitted and received only between MPs which have established the peer link through the peering procedure. In order to establish a mesh link with a candidate MP discovered through the mesh discovery procedure, the MP exchanges a peer link open frame and a peer link confirm frame with the candidate MP.

Figure 4:
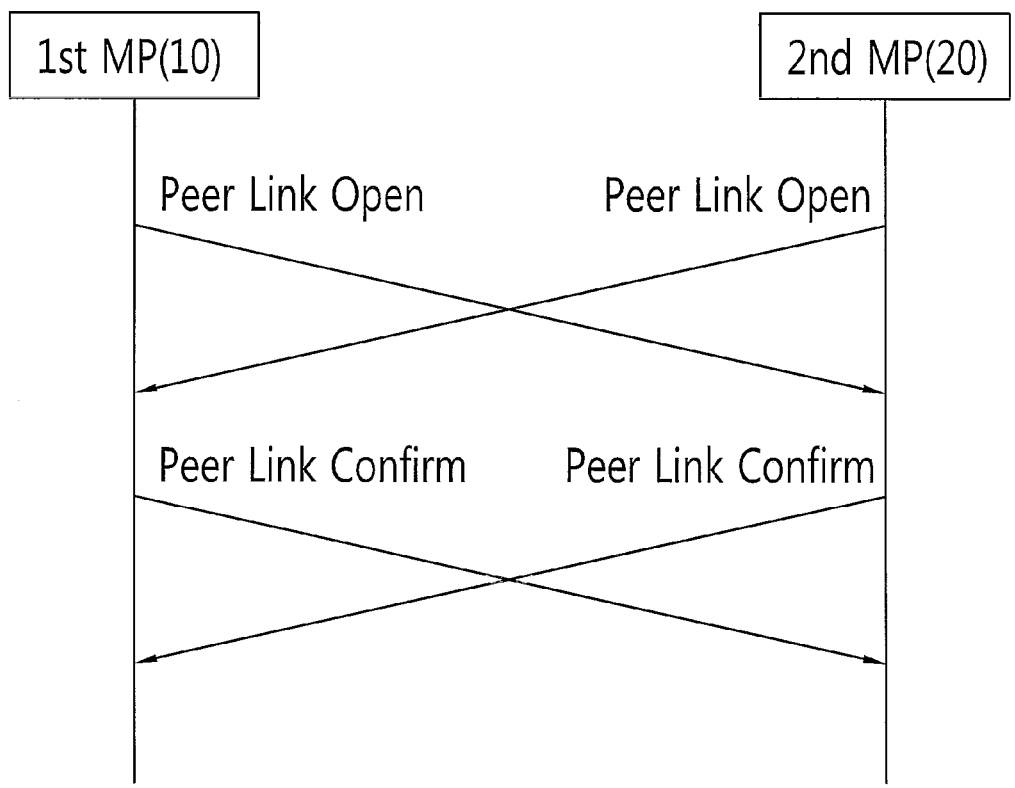
FIG. 4 is a message flow diagram showing a mesh link establishment procedure according to an embodiment of the present invention.

FIG. 4 is a message flow diagram showing a mesh link establishment procedure according to an embodiment of the present invention.

Referring to FIG. 4, a first MP 10 transmits a first peer link open frame to a second MP 20, and in response thereto, receives a first peer link confirm frame from the second MP 20. In addition, the second MP 20 also transmits a second peer link open frame to the first MP 10, and in response thereto, receives a second peer link confirm frame from the first MP 10.

The first peer link open/confirm frame and the second peer link open/confirm frame are exchanged irrespective of an order. For example, the first MP 10 may receive the second peer link open frame from the second MP 20 or may transmit the first peer link open frame after receiving the second peer link open frame. In addition, the first MP 10 may transmit the second peer link open frame before or after transmitting to the second MP 20 the second peer link response frame that is a response for the received second peer link open frame.

According to the embodiment of the present invention, information of an MP related to a supported channel and a supported regulatory class is included in each of the peer link open frame and the peer link confirm frame which are exchanged between the first MP 10 and the second MP 20. That is, information regarding a channel and regulatory class supported by the MP is included in the peer link open frame and the peer link confirm frame. Information regarding the channel and regulatory class may be independently included or may be interdependently included (e.g., in case of a type of channel supported in a specific regulatory class).

FIGS. 5 and 6 are tables showing information elements included in a body part of a peer link open frame and particular notes for each information element according to an embodiment of the present invention. In FIGS. 5 and 6, regulatory class information and channel information are independently included. However, the embodiment of the present invention is not limited thereto.

Referring to FIGS. 5 and 6, the body part of the peer link open frame includes category information, action value information, capability information, and supported rate information. When a specific condition is satisfied, the body part may include extended support rate information, power capability information, supported channel information, robust security network (RSN) information, quality of service (QoS) capability information, mesh ID information, mesh configuration information, peer link management information, mesh security capability information element (MSCIE) information, mesh security association handshake information element (MSAIE) information, and message integration code (MIC) information.

In addition, when an MP transmitting the peer link open frame supports extended channel switching, supported regulatory class information is included in the body part of the peer link open frame. The supported regulatory class information is used when the MP announces information on the supported regulatory class to a counterpart MP. According to an aspect of the present invention, the supported regulatory class information may be information which must be included in the peer link open frame so that a regulatory class switching service is used in the mesh network. However, as it can be seen in FIG. 5, when the MP supports the extended channel switching, the supported channel information may not be included in the body part of the peer link open frame.

According to the embodiment of the present invention, when the supported channel information and the supported regulatory class information are included in the peer link open frame, the supported channel information and the supported regulatory class information are also included in a peer link confirm frame transmitted in response thereto. Features of the supported channel information and the supported regulatory class information included in the peer link confirm frame are the same as those of the aforementioned peer link open frame, and thus descriptions thereof will be omitted.

All MPs participating in one mesh network have to operate in the same regulatory class, and also have to operate in the same channel. If different mesh networks are used, a regulatory class and/or channel for which each mesh network operates may be identical to or different from each other. However, if a first mesh network and a second mesh network have the same mesh profile, an MP of the first mesh network (e.g., the first MP) and an MP of the second mesh network (e.g., the second MP) may respectively operate in different regulatory classes and/or different channels.

In such a case, if the first MP and the second MP intend to establish a peer link, a regulatory class of the first mesh network and/or channel and a regulatory class of the second mesh network and/or channel have to be integrated into one. In addition, when interference with another network (e.g., BSS, IBSS, or another mesh network) is significant, there is a need to allow changes of a regulatory class and/or channel currently being used in the mesh network. Therefore, there is a need for a protocol by which MPs, each of which is currently establishing the peer link or intends to establish the peer link, changes a current regulatory class and/or channel to another regulatory class and/or channel.

The protocol for changing the regulatory class and/or channel in the mesh network according to the embodiment of the present invention uses a channel precedence field included in a mesh configuration element. The channel precedence field may have a specific size (e.g., 4 octets), and may be set to a specific integer value. In addition, the channel precedence value is initialized to any value according to a physical interface.

According to the embodiment of the present invention, a value set on the channel precedence field is set not according to a channel number alone but according to a regulatory class number and a group of channel numbers. That is, the value of the channel precedence field included in the mesh configuration element (e.g., a beacon frame, a probe response frame, etc.) is set by considering both a regulatory class and a channel which are currently being used (i.e., by considering which channel is used for which regulatory class).

An MP which has the same mesh profile and which has discovered a candidate MP operating in another regulatory class and/or channel in the mesh discovery procedure compares a value of a channel precedence field currently being set by the MP with a value of a channel precedence field included in a frame (i.e., a beacon frame or a probe response frame) transmitted by the candidate MP. If the channel precedence value of the MP is less than the channel precedence value of the candidate MP, the MP changes the regulatory class and/or channel currently being used by a regulatory class and/or channel currently being used by the counterpart MP. In this case, the channel precedence value of the MP is also changed.

Meanwhile, if the MP intends to change the regulatory class and/or channel in the mesh network, the MP needs to announce its intent to a peer MP. This is because communication through a peer link is possible only between MPs having the same regulatory class and channel, and if an MP which intends to change the regulatory class and/or channel does not announce its intent to the peer MP, the peer link of the peer MP is released unilaterally by the MP. Therefore, when the MP intends to change the regulatory class and/or channel, it is preferable that the MP announces its intent to the peer MP so that the peer MP can have a chance to determine whether the peer link is maintained or released.

According to the embodiment of the present invention, as a method of announcing the intent of the MP which intends to change the regulatory class and/or channel, a switch announcement frame of the regulatory class and channel is transmitted to the peer MP. The switch announcement frame of the regulatory class and channel may be a mesh channel switch announcement frame, but the embodiment of the present invention is not limited thereto.

According to the embodiment of the present invention, the mesh channel switch announcement frame may be transmitted using point inter-frame space (PIFS) instead of distributed inter-frame space (DIFS). A channel access probability can be decreased by using the PIFS instead of the DIFS. That is, before the regulatory class and/or channel is switched, it is preferable that a procedure of switching the regulatory class and/or channel is scheduled so that all neighboring peer MPs (including an MP operating in a power-save mode) can have a chance to receive at least one mesh channel switch announcement frame. Therefore, the MP may transmit the mesh channel switch announcement frame after determining that a wireless medium is idle for one PIFS period and performing backoff.

Figure 7:
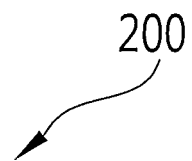
FIG. 7 shows a format of a mesh channel switch announcement frame as an example of a switch announcement frame according to an embodiment of the present invention.

FIG. 7 shows a format of a mesh channel switch announcement frame as an example of a switch announcement frame according to an embodiment of the present invention.

Referring to FIG. 7, a mesh channel switch announcement frame 200 includes a category field 210, an action value field 220, and a mesh channel switch announcement element field 230. The category field 210 may include a category belonging to the mesh channel switch announcement frame, e.g., a value indicating a management category. The action value field 220 may include a value indicating a specific action describable by the mesh channel switch announcement frame 200. In addition, the mesh channel switch announcement element field 230 is used by an MP in a mesh network, and informs another MP of various values, e.g., a time at which the MP changes to a new regulatory class and/or channel, a regulatory class number and channel number of a new regulatory class and/or channel, a precedence value determined by combination of the new regulatory class and channel, etc.

Figure 8:
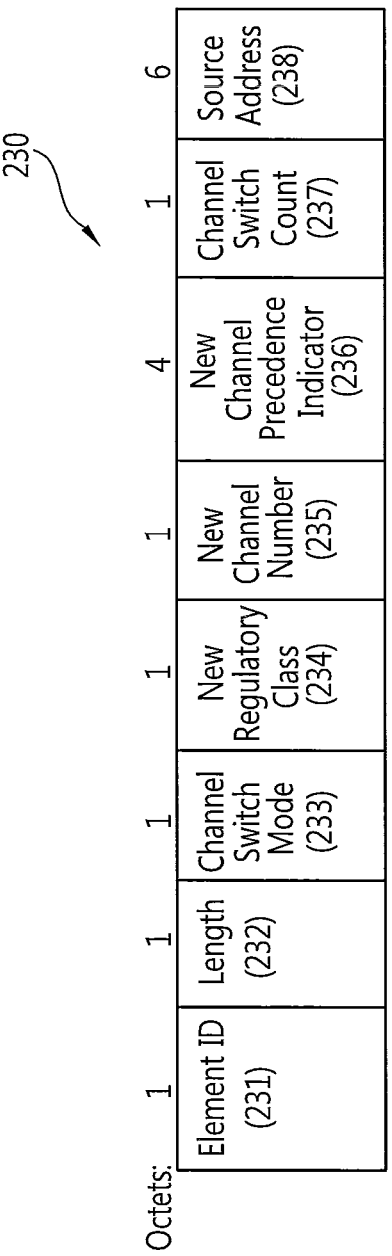
FIG. 8 shows a format of a mesh channel switch announcement element field of a mesh channel switch announcement frame of FIG. 7 according to an embodiment of the present invention.

FIG. 8 shows a format of the mesh channel switch announcement element field 230 according to an embodiment of the present invention. Referring to FIG. 8, the mesh channel switch announcement element field 230 includes an element ID field 231, a length field 232, a channel switch mode field 233, a new regulatory class field 234, a new channel number field 235, a new channel precedence indicator field 236, a channel switch count field 237, and a source address field 238.

The element ID field 231 is set to a value indicating that a mesh channel switch announcement element is the aforementioned information element. The length field 232 may be set to a subsequent information length, e.g., a value indicating 14 octets.

The channel switch mode field 233 indicates various restrictions on transmission of an MP receiving a mesh channel switch announcement frame until a channel switch. An MP transmitting the mesh channel announcement frame may set the field 233 to either zero (0) or one (1) on transmission. If the channel switch mode field 233 is set to one (1), the MP receiving the mesh channel switch frame does not transmit any data in a current channel in a current regulatory class until a time set on the channel switch count field 237 reaches. The channel switch mode field is set to one (1) to request neighboring MPs not to transmit data frames on the current channel until the scheduled channel switch. If the channel switch mode field 233 is set to zero (0), no restriction is imposed on the MP receiving the mesh channel switch announcement frame 200.

The new regulatory class field 234 is set to a value indicating the number of a new regulatory class to which the MP is switched. As such, in the embodiment of the present invention, by adding the new regulatory class field 234 to the mesh channel switch announcement element, the new regulatory class to which the MP is switched is announced to the peer MP.

The new channel number field 235 is set to a value indicating the number of a new channel to which the MP is switched. The new channel precedence indicator field 236 is set to a precedence value determined by combination of a regulatory class and channel to which the MP is newly switched. The channel switch count field 237 is indicated in a time unit (TU), and represents a time at which the MP transmitting the mesh channel switch announcement frame switches to a new regulatory class and/or channel. The source address field 238 is set to a value indicating a medium access control (MAC) address of an initiator MP which has generated the mesh channel switch announcement frame.

The MP receiving the mesh channel switch announcement frame 200 shown in FIG. 7 and FIG. 8 compares a value of the channel precedence indicator filed set on a received frame with a channel precedence value currently being set by the MP. If the channel precedence value currently being set by the MP is less than the channel precedence value included in the mesh channel switch announcement element field, the receiving MP also changes the regulatory class and/or channel. For this, the receiving MP sets its mesh channel switch (MCS) timer to a time set on the channel switch count field of the received mesh channel switch announcement frame. Further, in order to announce such changes to its peer MP, the receiving MP generates and transmits the mesh channel switch announcement frame. When the MCS timer expires, the receiving MP switches to the new regulatory class and/or channel. During a time period when the MCS timer is set, the mesh channel switch announcement frame is not generated.

Next, a protocol for switching a regulatory class and/or channel by an MP constituting a mesh network with one or more peer MPs by using the mesh channel switch announcement frame 200 shown in FIG. 7 and FIG. 8 will be described.

In practice, the one or more MPs constituting the mesh network may simultaneously attempt to switch the regulatory class and/channel. Thus, a mechanism for solving such a collision problem is included in the protocol by introducing a mesh channel switch (MCS) timer.

After an MP determines that the regulatory class and/or channel need to be switched, the MP transmits a frame (e.g., the aforementioned mesh channel switch announcement frame) for announcing its intent. First, the MP selects a mesh channel switch waiting time in a range of 0 to 255 (in a unit of TU). The mesh channel switch waiting time indicates a time required until the MP switches to a new channel or a new channel in a new regulatory class. The MP sets the MCS timer to the waiting time, and thereafter transmits the mesh channel switch announcement frame to each peer MP constituting the mesh network. Values of a new candidate regulatory class, a new candidate channel, and a new candidate channel precedence indicator are written in the mesh channel switch announcement element field of the mesh channel switch announcement frame. The channel switch count field is set to the chosen waiting time.

If the MP receives the mesh channel switch announcement frame having a precedence value greater than that of a current channel of a physical layer (PEW) through which the mesh channel switch announcement frame is received, the MP sets the MCS timer to a value of the channel switch count field of the received mesh channel switch announcement frame. Further, the MP transmits the mesh channel switch announcement frame to each peer MP constituting the mesh network so as to announce a value of a newly set MCS timer, that is, the MP sets the channel switch count field of the transmitted mesh channel switch announcement frame to a value of a new MCS timer.

When the one or more MPs constituting the mesh network needs to independently switch the regulatory class and/or channel, each MP may transmit the mesh channel switch announcement frame. If an MP receives one or more mesh channel switch announcement frames, the MP responds only to a mesh channel switch announcement frame having a channel precedence value greater than that of a previously received mesh channel switch announcement frame. The MP which receives the mesh channel switch announcement frame ignores the received channel switch announcement when the current channel precedence value of the receiving MP is greater than the channel precedence value in the new channel precedence indicator field. If the channel precedence value of the newly received announcement frame is equal to that of the previously received announcement frame, the MP responds only when a source address is less than that of the previously received announcement frame. If the MP shows a specific response to the newly received announcement frame, the MP updates the values of the candidate regulatory class, the candidate channel, and the candidate channel precedence indicator, and sets the MCS timer to the channel switch count value of the received announcement frame. Further, the MP transmits the mesh channel switch announcement frame including new information to each peer MP constituting the mesh network.

When the MCS timer is set on the MP, the MP cannot initiate a new mesh channel switch announcement frame during a duration of the MCS timer. When the MCS timer expires, the MP switches its PHY to a new channel or a new channel in a new regulatory class. Further, the MP updates its channel precedence indicator to a candidate channel precedence indicator.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing a channel switch in a mesh network, carried in a first Mesh Point (MP), the method comprising:
    configuring a peer link between the first MP and a second MP; and
    transmitting a mesh channel switch announcement frame from the first MP to the second MP, wherein the mesh channel switch announcement frame comprises a new regulatory class field, a new channel number field, and a precedence indicator field,
    wherein the new regulatory class field indicates the number of a new regulatory class after the channel switch,
    wherein the new channel number field indicates the number of a new channel to which the first MP is moving,
    wherein the precedence indicator field is set to a channel precedence value, and
    wherein the second MP ignores the received channel switch announcement when a current channel precedence value of the second MP is greater than the channel precedence value.

2. The method of claim 1, wherein the peer link is configured by exchanging a peer link open frame and a peer link response frame between the first MP and the second MP.

3. The method of claim 2, wherein the peer link open frame comprises supported regulatory classes indicating operating classes that the first is capable of operating.

4. The method of claim 1, further comprising:
    setting a channel switch count field included in the mesh channel switch announcement frame to a value indicating that when the channel switch has occurred.

5. The method of claim 1, further comprising:
    setting a channel switch mode field included in the mesh channel switch announcement frame to one (1) when the first MP requests neighboring MPs not to transmit data frames on the current channel until the scheduled channel switch.

6. A method of performing a channel switch in a mesh network, the method comprising:
    generating a mesh channel switch announcement frame to initiate the channel switch, wherein the switch announcement frame comprises a new regulatory class field, a new channel number field, and a new channel precedence indicator field, the new regulatory class field being set to a number of a new regulatory class after the channel switch, a new channel number field being set to a number of a new channel to which a mesh point (MP) is moving, and the new channel precedence indicator field being set to a new channel precedence value; and
    transmitting the mesh channel switch announcement frame,
    wherein a MP receiving the mesh channel switch announcement frame ignores the received channel announcement when a current channel precedence value of the received MP is greater than the new channel precedence value in the new channel precedence indicator field.

7. The method of claim 6, wherein the mesh channel switch announcement frame further comprises a channel switch count field,
    wherein the channel switch count field is set to a value indicating that when the channel switch is occurred.

8. The method of claim 6, wherein the mesh channel switch announcement frame further comprises a channel switch mode field, and the channel switch mode field is set to one (1) to request neighboring MPs not to transmit data frames on the current channel until the scheduled channel switch.

* * * * *